(12) United States Patent
Nagai et al.

(10) Patent No.: US 9,856,148 B2
(45) Date of Patent: Jan. 2, 2018

(54) METHOD FOR PRODUCING TITANIUM OXIDE USING POROUS TITANIUM COMPOUND IMPREGNATED WITH SOLUTION

(71) Applicants: National Institute of Advanced Industrial Science and Technology, Tokyo (JP); ISHIHARA SANGYO KAISHA, LTD., Osaka (JP)

(72) Inventors: Hideaki Nagai, Tsukuba (JP); Junji Akimoto, Tsukuba (JP); Kunimitsu Kataoka, Tsukuba (JP); Yoshimasa Kumashiro, Yokkaichi (JP); Tomoyuki Sotokawa, Yokkaichi (JP); Nobuharu Koshiba, Yokkaichi (JP)

(73) Assignees: NATIONAL INSTITUTE OF ADVANCED INDUSTRIAL SCIENCE AND TECHNOLOGY, Tokyo (JP); ISHIHARA SANGYO KAISHA, LTD., Tokyo (JP)

( * ) Notice: Subject to any disclaimer, the term of this patent is extended or adjusted under 35 U.S.C. 154(b) by 186 days.

(21) Appl. No.: 14/911,132

(22) PCT Filed: Aug. 14, 2014

(86) PCT No.: PCT/JP2014/071445
§ 371 (c)(1),
(2) Date: Feb. 9, 2016

(87) PCT Pub. No.: WO2015/025796
PCT Pub. Date: Feb. 26, 2015

(65) Prior Publication Data
US 2016/0194214 A1     Jul. 7, 2016

(30) Foreign Application Priority Data
Aug. 19, 2013 (JP) .................................. 2013-169624

(51) Int. Cl.
*C01G 23/00* (2006.01)
*C01G 23/047* (2006.01)
*H01M 4/485* (2010.01)

(52) U.S. Cl.
CPC ........... *C01G 23/005* (2013.01); *C01G 23/00* (2013.01); *C01G 23/047* (2013.01); *H01M 4/485* (2013.01);
(Continued)

(58) Field of Classification Search
CPC .... C01G 23/005; C01G 23/047; C01G 23/00; H01M 4/485; C01P 2006/40;
(Continued)

(56) References Cited

U.S. PATENT DOCUMENTS

| 2008/0111104 A1 | 5/2008 | Lefenfeld et al. |
| 2010/0151327 A1 | 6/2010 | Nakahara et al. |

(Continued)

FOREIGN PATENT DOCUMENTS

| JP | 2002 289194 | 10/2002 |
| JP | 2005 022893 | 1/2005 |

(Continued)

OTHER PUBLICATIONS

Armstrong, A.R., Advanced Materials, vol. 17, pp. 862-865, 2000.
(Continued)

*Primary Examiner* — Anthony J Zimmer
(74) *Attorney, Agent, or Firm* — Paul E. White, Jr.; Manelli Selter PLLC

(57) ABSTRACT

Provided are: an alkali metal titanium oxide having a uniform composition and that is such that there are no residual by-products having a different composition or unreacted starting materials; and a method for producing a titanium oxide and proton exchange body obtained by processing the alkali metal titanium oxide. The method (Continued)

produces an alkali metal titanium oxide by firing the result of impregnating the surface and inside of pores of porous titanium compound particles with an aqueous solution of an alkali metal-containing component. The alkali metal titanium oxide is subjected to proton exchange, and with the proton exchange body of the alkali metal titanium oxide as the starting material, the titanium oxide is produced through a heat processing step.

9 Claims, 13 Drawing Sheets

(52) U.S. Cl.
    CPC ...... *C01P 2002/72* (2013.01); *C01P 2004/03* (2013.01); *C01P 2004/32* (2013.01); *C01P 2004/61* (2013.01); *C01P 2004/62* (2013.01); *C01P 2006/12* (2013.01); *C01P 2006/14* (2013.01); *C01P 2006/16* (2013.01); *C01P 2006/40* (2013.01)

(58) Field of Classification Search
    CPC .............. C01P 2006/14; C01P 2004/32; C01P 2006/16; C01P 2006/12; C01P 2004/62; C01P 2004/61; C01P 2004/03; C01P 2002/72
    See application file for complete search history.

(56) References Cited

U.S. PATENT DOCUMENTS

| | | | |
|---|---|---|---|
| 2011/0052994 | A1 | 3/2011 | Harada et al. |
| 2013/0244114 | A1* | 9/2013 | Yamamoto ............ H01M 4/485 429/231.5 |

FOREIGN PATENT DOCUMENTS

| | | | |
|---|---|---|---|
| JP | 2008 117625 | A | 5/2008 |
| JP | 2008 255000 | A | 10/2008 |
| JP | 2010 502843 | | 1/2010 |
| JP | 2010 140863 | A | 6/2010 |
| JP | 2010 254482 | A | 11/2010 |
| JP | 2011 048947 | A | 3/2011 |
| JP | 2011 166966 | A | 8/2011 |
| JP | 2011 173761 | A | 9/2011 |
| JP | 2012 069432 | | 4/2012 |

OTHER PUBLICATIONS

Brousse, T., Journal of Power Sources, vol. 158, pp. 571-577, 2006.
Inaba, M. et al., Journal of Power Sources, vol. 189, pp. 580-584, 2009.
Feist, T. P. et al., Journal of Solid State Chemistry, vol. 101, pp. 275-295, 1992.
Brohan, L. et al. Solid State Ionics, vol. 9-10, pp. 419-424, 1983.

* cited by examiner

METHOD FOR PRODUCING TITANIUM OXIDE USING POROUS TITANIUM COMPOUND IMPREGNATED WITH SOLUTION

This application is the national phase of international application PCT/JP2014/071445 filed 14 Aug. 2014 which designated the U.S.

TECHNICAL FIELD

The present invention relates to a novel method for producing an alkali metal titanium oxide, and methods for producing a proton exchange product and a titanium oxide obtained by treating the alkali metal titanium oxide.

BACKGROUND ART

Currently in Japan, almost all secondary batteries mounted on portable electronic devices such as cell phones and laptop computers are lithium secondary batteries. It is predicted that the lithium secondary batteries will be also put in practical use as large-size batteries for hybrid cars, electric power load leveling systems and the like in the future, and their importance becomes increasingly high.

Any of the lithium secondary batteries has, as major constituents, a positive electrode and a negative electrode capable of reversibly occluding and releasing lithium, and further a separator containing a nonaqueous electrolyte solution, or a solid electrolyte.

Among these constituents, electrode active materials under investigation include oxides such as a lithium cobalt oxide ($LiCoO_2$), a lithium manganese oxide ($LiMn_2O_4$) and a lithium titanate ($Li_4Ti_5O_{12}$), metals such as metallic lithium, lithium alloys and tin alloys, and carbon materials such as graphite and MCMB (mesocarbon microbeads).

The voltage of a battery is determined by difference in the chemical potential depending on the lithium content in each active material. It is a feature of lithium secondary batteries excellent in the energy density that particular combinations of active materials can produce high potential differences.

In particular, the combination of a lithium cobalt oxide $LiCoO_2$ active material and a carbon material as an electrode is widely used in current lithium batteries, because a voltage of nearly 4 V is possible; the charge and discharge capacity (an amount of lithium extracted from and inserted in the electrode) is large; and the safety is high in addition, this combination of the electrode materials is widely used in current lithium batteries.

On the other hand, it has become clear that a lithium secondary batteries with excellent performance in the charge and discharge cycle over a long period is possible in the combination of a spinel-type lithium manganese oxide ($LiMn_2O_4$) active material and a spinel-type lithium titanium oxide ($Li_4Ti_5O_{12}$) active material as electrode, because the materials make the insertion and extraction reaction of lithium to be smoothly carried out and make a change in the crystal lattice volume accompanying the reaction to be smaller, and the combination is put in practical use.

With respect to chemical batteries such as lithium secondary batteries and capacitors, there are demanded electrode active materials of further high performance (large capacity) in combinations of oxide active materials as described above, because it is predicted that there hereafter become necessary large-size and long-life chemical batteries such as power sources for automobiles, large-capacity backup power sources and emergency power sources.

Titanium oxide-based active materials, in the case where a lithium metal is used as a counter electrode, generate a voltage of about 1 to 2 V. Hence, the possibility of titanium oxide-based active materials with various crystal structures is studied as negative electrode active materials.

There are paid attention to, as electrode materials, active materials such as a spinel-type lithium titanium oxide $Li_4Ti_5O_{12}$, a titanium dioxide with sodium bronze-type crystal structure (in the present description, the "titanium dioxide with sodium bronze-type crystal structure" is abbreviated to "$TiO_2(B)$") and $H_2Ti_{12}O_{25}$ being a titanium oxide containing a hydrogen element in its crystal structure (Patent Literatures 1 to 6, Non Patent Literatures 1 to 5).

These active materials are mainly obtained by firing a starting raw material obtained by mechanically mixing titanium oxide as a Ti raw material and a solid of an alkali metal salt, and followed by an acid treatment and the like (Patent Literatures 1,2 and 4 to 6, Non Patent Literatures 1 to 5).

In the mixing methods using solid samples, however, the mixing state of the samples in the mixing stage is nonhomogeneous in the micro level; the progress of the solid reaction brings the heterogeneity near to homogeneity, but there is a fear that unreacted raw materials remain. Hence, depending on the particle sizes of sample raw materials, firing has to be carried out longer than needed in some cases, and after the firing, crushing and mixing have to be carried out to enhance the homogeneity of the product in some cases.

Further, there is also a case where titanium oxide and an alkali metal salt are mixed and dissolved in water to make a slurry, which is dried by spray drying using a spray drier or spray pyrolysis to thereby prepare a mixed raw material (Patent Literature 3).

In the case where a slurry in which titanium oxide and an alkali metal salt are dissolved in water is dried by spray drying or the like, although the homogeneity of sprayed droplets themselves is held, the alkali metal salt is segregated in the drying process and the mixing state of the titanium oxide and the alkali metal salt is heterogeneous in the micro level, therefore making the product by firing to be nonhomogeneous.

CITATION LIST

Patent Literature

Patent Literature 1: JP 2008-117625 A
Patent Literature 2: JP 2010-140863 A
Patent Literature 3: JP 2011-173761 A
Patent Literature 4: JP 2012-166966 A
Patent Literature 5: JP 2011-48947 A
Patent Literature 6: JP 2008-255000 A

Non Patent Literature

Non Patent Literature 1: L. Brohan, R. Marchand, Solid State Ionics, 9-10, 419-424(1983)
Non Patent literature 2: A. R. Armstrong, G. Armstrong, J. Canales, R. Garcia, P. G. Bruce, Advanced Materials, 17, 862-865 (2005)
Non Patent literature 3: T. Brousse, R. Marchand, P. L. Taberna, P. Simon, Journal of Power Sources, 158, 571-577 (2006)
Non Patent literature 4: M. Inaba and Y. Oba, F. Niina, Y. Murota, Y. Ogino, A. Tasaka, K. Hirota, Journal of Powder Sources, 189, 580-584 (2009)

Non Patent literature 5: T. P. Feist, P. K. Davies, Journal of Solid State Chemistry, 101, 275-295 (1992)

SUMMARY OF INVENTION

Technical Problem

The present invention has an object to solve the above-mentioned present problem, and provide a method for easily producing an alkali metal titanium oxide with homogeneous composition in which no by-products with different composition and no unreacted raw materials remain, or even if these are present, the presence is only in trace amounts. The present invention also has an object to provide methods for producing a proton exchange product and a titanium oxide obtained by treating the alkali metal titanium oxide.

Solution to Problem

As a result of exhaustive studies, the present inventors have found that by firing a porous titanium compound particle for which the pore interiors and surface thereof have been impregnated with an aqueous solution of a component containing an alkali metal, an alkali metal titanium oxide with homogeneous composition in which no by-products with different compositions and no unreacted raw materials remain can be obtained, and that when a proton exchange product obtained by reacting the alkali metal titanium oxide with an acidic compound is subjected, as a starting raw material, to a heat treatment, there can similarly be obtained a titanium oxide with homogeneous composition in which no by-products different compositions and no unreacted raw materials remain. These findings have led to the completion of the present invention.

That is, the present invention provides methods for producing an alkali metal titanium oxide, a proton exchange product and a titanium oxide, shown in the below.

(1) A method for producing an alkali metal titanium oxide, comprising impregnating the pore interiors and surface of a porous titanium compound particle with an alkali metal-containing component, and firing the particle.
(2) The method according to (1), wherein the porous titanium compound particle has a particle size of 0.1 μm or larger and smaller than 100 μm.
(3) The method according to (1), wherein the porous titanium compound particle has a specific surface area of 10 m2/g or larger and smaller than 1,000 m2/g.
(4) The method according to (1), wherein the alkali metal titanium oxide has a specific surface area of 0.1 m2/g or larger and smaller than 10 m2/g.
(5) The method according to (1), wherein the impregnation with the alkali metal-containing component is suspending the porous titanium compound particle in an aqueous solution of an alkali metal compound with a pH of 8 or higher.
(6) The method according to (1), wherein ultrasonic wave irradiation is conducted during the impregnation with the alkali metal-containing component.
(7) The method according to (1), wherein the porous titanium compound particle is dried before the impregnation with the alkali metal-containing component.
(8) The method according to (1), wherein the alkali metal titanium oxide has a shape of a secondary particle made by assembly of primary particles with anisotropic structure.
(9) The method according to (1), wherein the alkali metal titanium oxide has a shape of a primary particle with isotropic structure.
(10) A method for producing a proton exchange product, comprising proton-exchanging the alkali metal titanium oxide obtained by a method according to any one of the above (1) to (9).
(11) A method for producing a titanium oxide, comprising proton-exchanging $Na_2Ti_3O_7$ as an alkali metal titanium oxide obtained by a method according to any one of the above (1) to (9) to thereby obtain a proton exchange product $H_2Ti_3O_7$, and subjecting the proton exchange product to a heat treatment in an oxygen gas atmosphere or in an inert gas atmosphere in a temperature range of 250° C. or higher and lower than 350° C.

Advantageous Effects of Invention

According to the present invention, an alkali metal titanium oxide with homogeneous composition can easily be produced. When a proton exchange product obtained by reacting the alkali metal titanium oxide with an acidic compound is subjected, as a starting raw material, to a heat treatment, a titanium oxide with homogeneous composition can also be easily obtained.

These alkali metal titanium oxide and titanium oxide with homogeneous compositions are useful in various applications; and for example, in the case where these are used as an electrode active material, there can be provided a lithium secondary battery which is expected to be excellent in the charge and discharge cycle over a long period and whose high capacity.

DESCRIPTION OF EMBODIMENTS

Figure 1:
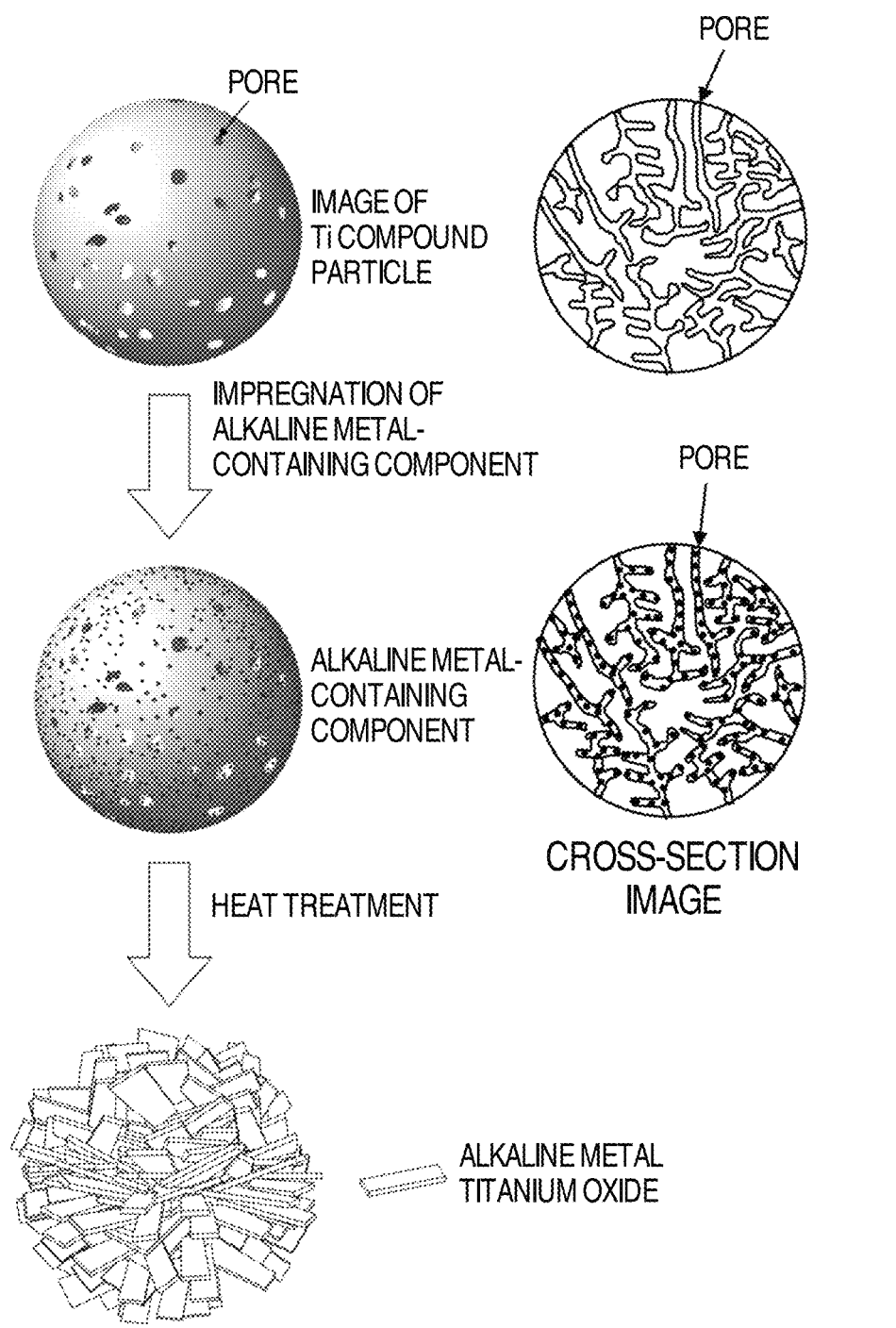
FIG. 1 is a schematic diagram of the production method according to the present invention.

The production methods according to the present invention will be described in more detail.
(The Method for Producing an Alkali Metal Titanium Oxide)

In the production methods according to the present invention, first, the pore interiors and surface of a porous titanium compound particle are impregnated with an alkali metal-containing component, and the particle is fired to thereby produce an alkali metal titanium oxide.

(1) The Porous Titanium Compound Particle

The porous titanium compound as a raw material includes porous titanium and titanium compounds, and at least one thereof is used.

The titanium compounds are not especially limited as long as containing titanium, and examples thereof include oxides such as TiO, $Ti_2O_3$ and $TiO_2$, titanium oxide hydrates represented by $TiO(OH)_2$, $TiO_2 \cdot xH_2O$ (x is arbitrary), and besides water-insoluble inorganic titanium compounds. Among these, titanium oxide hydrates are especially preferable, and there can be used metatitanic acid represented by $TiO(OH)_2$ or $TiO_2 \cdot H_2O$, orthotitanic acid represented by $TiO_2 \cdot 2H_2O$, and mixtures thereof.

A titanium oxide hydrate can be obtained by thermal hydrolysis or neutralizing hydrolysis of a titanium compound. For example, metatitanic acid can be obtained by thermal hydrolysis, neutralizing hydrolysis or the like of titanyl sulfate ($TiOSO_4$), or neutralizing hydrolysis at a high temperature of titanium chloride; orthotitanic acid, by neutralizing hydrolysis at a low temperature of titanium sulfate ($Ti(SO_4)_2$) or titanium chloride; and a mixture of metatitanic acid and orthotitanic acid, by suitable control of the neutralizing hydrolysis temperature of titanium chloride. A neutralizing agent to be used in the neutralizing hydrolysis is not especially limited as long as being a usual water-soluble alkali compound, and there can be used sodium hydroxide, potassium hydroxide, calcium hydroxide, sodium carbonate, potassium carbonate, ammonia and the like. There can further be used urea ($(NH_2)_2CO + H_2O \rightarrow 2NH_3 + CO_2$) or the like to produce an alkali compound by an operation such as heating.

The specific surface area to be a factor indicating the porosity of the titanium oxide hydrate thus obtained can be controlled by the deposition speed of the precipitation of the titanium oxide hydrate, or controlled by aging the produced titanium oxide hydrate in an aqueous solution. For example, by controlling the thermal hydrolysis temperature, or controlling the concentration and the dropping speed of the neutralizing agent for the neutralizing hydrolysis, the deposition speed of the precipitation of the titanium oxide hydrate can be controlled. When the produced titanium oxide hydrate is held in the state of being stirred in a high-temperature aqueous solution, the dissolution-redeposition of the titanium oxide hydrate in the aqueous solution is caused by Ostwald ripening, and the particle diameter increases and the pore is clogged to reduce the specific surface area; thereby this treatment can also regulate the porosity.

The particle shape of the porous titanium compound is not especially limited, including isotropic shapes such as spherical and polyhedral ones and anisotropic shapes such as rod-like and plate-like ones, and can suitably be selected according to the shape of a desired product. Further, the form of the particle may be a primary particle or a secondary particle, and also can suitably be selected according to the shape of a desired product.

Here, the secondary particle in the present invention refers to one which is in the state that primary particles firmly bond with one another, and which is not easily disassembled by usual industrial operations such as mixing, crushing, filtration, transportation, weighing, bagging and piling, and almost all remains as the secondary particle.

The particle size of the porous titanium compound is determined by measuring particle diameters of 100 particles in an image by a scanning electron microscope or the like and employing its average value (electron microscope method). The particle size is not especially limited, but has a correlation with the size of the produced alkali metal titanium oxide or titanium oxide. Hence, for example, in the case of using the alkali metal titanium oxide or the titanium oxide as an electrode active material, the porous titanium compound is an isotropic and preferably spherical primary particle; and the particle size is preferably 0.1 μm or larger and smaller than 100 μm, and more preferably 0.5 μm or larger and smaller than 50 μm.

The specific surface area (by the BET method using nitrogen adsorption) of the porous titanium compound is preferably 10 m2/g or larger and smaller than 1000 m2/g, and more preferably 50 m2/g or larger and smaller than 600 m2/g.

When the specific surface area of the porous titanium compound is made large, the reactivity of the titanium compound with an alkali metal compound becomes high and the particle growth of an alkali metal titanium oxide as a reaction product progresses. According to the method of the present invention, by controlling the specific surface area of the porous titanium compound as a raw material, the shape of the alkali metal titanium oxide as the reaction product can be controlled. For example, when there is used a primary particle of the titanium compound whose specific surface area is 100 m2/g or larger and smaller than 400 m2/g, a secondary particle comprising an alkali metal titanium oxide with anisotropic structure can be produced. The secondary particles form an aggregated form (see Example 1, and FIG. 1 and FIG. 5). By contrast, when a primary particle of the titanium compound whose specific surface area is smaller than 100 m2/g or 400 m2/g or larger is used, due to the particle growth, a primary particle of an alkali metal titanium oxide with isotropic structure can be produced. The primary particles also form an aggregate (see Example 2 and FIG. 14).

Further, the average pore diameter is preferably between 1 nm and 10 nm; and the pore volume is preferably between 0.05 cm$^3$/g and 1.0 cm$^3$/g.

The pore volume can be determined by determining a pore distribution by analyzing a nitrogen adsorption and desorption isotherm determined by the nitrogen adsorption method with the BET method, the HK method, the BJH method or the like, and calculating a pore volume from the pore distribution. The average pore diameter can be determined from the measurement values of the total pore volume and the specific surface area.

(2) An Alkali Metal-Containing Component

An alkali metal-containing component is not especially limited as long as being a compound containing an alkali metal (alkali metal compound) and being soluble in water. For example, in the case where the alkali metal is Li, the alkali metal compound includes salts such as $Li_2CO_3$ and $LiNO_3$, hydroxides such as LiOH, and oxides such as $Li_2O$. In the case where the alkali metal is Na, the alkali metal compound includes salts such as $Na_2CO_3$ and $NaNO_3$, hydroxides such as NaOH, and oxides such as $Na_2O$ and $Na_2O_2$. In the case where the alkali metal is K, the alkali metal compound includes salts such as $K_2CO_3$ and $KNO_3$, hydroxides such as KOH, and oxides such as $K_2O$ and $K_2O_2$. In the case of production of a sodium titanium oxide, $Na_2CO_3$ and the like are especially preferable.

(3) Impregnation of the Porous Titanium Compound Particle with the Alkali Metal-Containing Component, and Firing The dried porous titanium compound particle is impregnated with an aqueous solution containing one or two or more of the above-mentioned alkali metal compounds selected from lithium, sodium, potassium, rubidium, cesium and the like so as to make a target chemical composition, filtered, thereafter as required, dried, and heated in an atmosphere where oxygen gas is present, such as in air, or in an inert gas atmosphere such as nitrogen or argon to thereby produce the alkali metal titanium oxide.

FIG. 1 schematically shows the situation in which the impregnation of the porous titanium compound particle with the alkali metal-containing component, and firing the resultant synthesize the alkali metal titanium oxide.

FIG. 1 schematically shows that a secondary particle comprising the alkali metal titanium oxide with anisotropic structure is produced from primary particles of the isotropic titanium compound.

A Preparatory Step of Impregnation

As described above, in the method according to the present invention, the pore interiors and surface of the porous titanium compound are impregnated with the alkali metal-containing component so as to make a target chemical composition. Since the impregnation amount of the porous titanium compound with an aqueous solution of an alkali metal compound changes depending on the surface area and the pore volume of the porous titanium compound as a raw material, and the concentration and pH of the aqueous solution in which the alkali metal-containing component (alkali metal compound) is dissolved, the impregnation amount needs to be confirmed in advance.

Specifically, the porous titanium compound is dried to remove moisture in the pores, and suspended in an aqueous solution to fully swell the pore interiors and the surface of the titanium compound with the aqueous solution in which the alkali metal compound is dissolved. Then, a solid fraction and a solution fraction are separated by filter filtration, centrifugation or the like, and the saturation amount (maximum impregnation amount) of the aqueous solution impregnated in the porous titanium compound is measured. Since the titanium compound has the hydrophilic surface, when the titanium compound particle is immersed in the aqueous solution in which the alkali metal compound is dissolved, the aqueous solution can be filled up to pore depths of the titanium compound particle and impregnated in a short time.

Since the saturation amount itself does not vary depending on the concentration of the alkali metal compound, the amount of the alkali metal compound to be impregnated can be regulated by changing the concentration. In the case where the porous titanium compound is a titanium oxide or a titanium oxide hydrate, the sample surface takes on a charge caused by OH groups in an aqueous solution. Usually, in an acidic solution, it charges positively; and in a basic solution, it charges negatively. Hence, alkali metal ions such as lithium, sodium and potassium ions being cations in an aqueous solution receive an electric repulsive force in an acidic solution, and an electric attractive force in a basic solution. Accordingly, in the case where the pH of an aqueous solution is basic, the interaction between the porous titanium compound and the alkali metal ions becomes strong, and the impregnation with the alkali metal compound can be made easy. In the case where the impregnation amount of the alkali metal compound is insufficient by a one-time impregnation step, the impregnation amount of the alkali metal compound is increased by repeating the step and a target chemical composition is enabled to be made.

A Regular Step of Impregnation

The porous titanium compound is dried to remove moisture in the pores, and suspended in an aqueous solution in which the alkali metal compound regulated to the predetermined concentration confirmed in the preparatory step is dissolved, to fully swell the pore interiors and the surface of the titanium compound with the aqueous solution in which the alkali metal compound such as lithium, sodium, potassium or the like is dissolved. After the alkali metal compound is impregnated up to the depths of the porous titanium compound so as to make a desired chemical composition, a solid fraction and a solution fraction are separated by filter filtration, a centrifuge or the like, and the solid fraction is preferably dried. In the case where the impregnation amount of the alkali metal compound of lithium, sodium, potassium or the like is insufficient by a one-time step, the impregnation amount of the alkali metal compound is increased by repeating the step and a target chemical composition is made.

Here, the target chemical composition suffices if being capable of providing a compound exhibiting an X-ray diffraction pattern similar to that characteristic of a desired alkali metal titanium oxide.

For example, in the case where a desired alkali metal titanium oxide is $Li_4Ti_5O_{12}$, a composition may be those capable of providing a compound with peaks characteristic of $Li_4Ti_5O_{12}$ at positions of 2θ of 18.5°, 35.7°, 43.3°, 47.4°, 57.3°, 62.9° and 66.1° (an error in any of which is about ±0.5°) in powder X-ray diffractometry (using a CuKα line). Similarly in the case where a desired alkali metal titanium oxide is $Na_2Ti_3O_7$, a composition may be those capable of providing a compound with peaks characteristic of $Na_2Ti_3O_7$ at positions of 2θ of 10.5°, 15.8°, 25.7°, 28.4°, 29.9°, 31.9°, 34.2°, 43.9°, 47.8°, 50.2° and 66.9° (an error in any of which is about ±0.5°) in powder X-ray diffractometry (using a CuKα line).

The concentration of the alkali metal compound can be varied preferably between 0.1 time and 1.0 time the saturation concentration.

The impregnation time is usually between 1 min and 60 min, and preferably between 3 min and 30 min.

During the impregnation, it is preferable to conduct ultrasonic wave irradiation.

The pH of the aqueous solution of the alkali metal compound is preferably regulated so that the surface charge of the porous titanium compound becomes negative when the porous titanium compound is suspended in the aqueous solution. In the case of the titanium oxide or the titanium oxide hydrate, since the surface charge becomes negative at a pH of 8 or higher, the pH of the aqueous solution of the alkali metal compound is preferably made to be 8 or higher.
Firing Then, the titanium compound particle impregnated with the alkali metal compound is fired.

The firing temperature can suitably be set depending on the kinds of the raw materials, and may be set usually at about 600° C. to 1,200° C., and preferably at 700° C. to 1,050° C. Further, the firing atmosphere is not especially limited, and the firing may be carried out usually in an oxygen gas atmosphere such as in air, or in an inert gas atmosphere such as nitrogen or argon.

The firing time can suitably be altered according to the firing temperature and the like. The cooling method also is not especially limited, and may usually be spontaneous cooling (in-furnace spontaneous cooling) or gradual cooling. Alkali metal titanium oxides obtained in this step, in the case where the alkali metal is Li, are titanium oxides with different Li/Ti ratios such as $LiTiO_2$, $LiTi_2O_4$, $Li_4TiO_4$, $Li_2TiO_3$, $Li_2Ti_3O_7$ and $Li_4Ti_5O_{12}$. Those in the case where the alkali metal is Na are titanium oxides with different Na/Ti ratios such as $NaTiO_2$, $NaTi_2O_4$, $Na_2TiO_3$, $Na_2Ti_6O_{13}$, $Na_2Ti_3O_7$ and $Na_4Ti_5O_{12}$. Further, those in the case where the alkali metal is K are titanium oxides with different K/Ti ratios such as $K_2TiO_3$, $K_2Ti_4O_9$, $K_2Ti_6O_{13}$ and $K_2Ti_8O_{17}$.

After the firing, as required, the fired material is crushed by a well-known method, and the above firing process may be again carried out. Here, the degree of the crushing may suitably be regulated according to the firing temperature and the like.

(A Production Method of a Proton Exchange Product of the Alkali Metal Titanium Oxide)

By using the alkali metal titanium oxide obtained in the above as a starting raw material, and by applying a proton exchange reaction in an acidic aqueous solution, there is obtained a proton exchange product of the alkali metal titanium oxide in which almost all of the alkali metal in the starting raw material compound is exchanged for hydrogen.

In this case, it is preferable that the alkali metal titanium oxide obtained in the above is dispersed in an acidic aqueous solution and held for a certain time, and thereafter dried. As an acid to be used, preferable is an aqueous solution containing one or more of hydrochloric acid, sulfuric acid, nitric acid and the like in any concentration. Use of dilute hydrochloric acid of 0.1 to 1.0 N in concentration is preferable. The treatment time is 10 hours to 10 days, and preferably 1 day to 7 days. In order to shorten the treatment time, it is preferable that the solution is suitably replaced by a fresh one. Further, in order to make the exchange reaction to easily progress, it is preferable that the treatment temperature is made to be higher than room temperature (20° C.), and to be 30° C. to 100° C. The drying can be applied to by a well-known drying method, and vacuum drying or the like is more preferable.

In the proton exchange product of the alkali metal titanium oxide thus obtained, the residual alkali metal amount originated from the starting material can be reduced below the detection limit of the chemical analysis with a wet method by optimizing the exchange treatment condition.

(A Heat Treatment of the Proton Exchange Product of the Alkali Metal Titanium Oxide, that is, a Production Method of a Titanium Oxide)

The proton exchange product of the alkali metal titanium oxide thus obtained is used as a starting raw material, and is subjected to a heat treatment in an oxygen gas atmosphere such as in air, or in an inert gas atmosphere such as nitrogen or argon, to thereby obtain a titanium oxide.

For example, in the case where $H_2Ti_{12}O_{25}$ as the titanium oxide is synthesized by using $H_2Ti_3O_7$ as the proton exchange product, the target titanium oxide $H_2Ti_{12}O_{25}$ is obtained accompanied by the generation of $H_2O$ due to thermal decomposition. In this case, the heat treatment temperature is in the range of 250° C. to 350° C., preferably in the range of 270° C. to 330° C. The treatment time is usually 0.5 to 100 hours, and preferably 1 to 30 hours; and the higher the treatment temperature, the shorter the treatment time can be.

EXAMPLES

Hereinafter, Examples will be shown and much more clarify features of the present invention. The present invention is not limited to these Examples.

Example 1

Production Method of $Na_2Ti_3O_7$ 6.25 g of titanyl sulfate hydrate (($TiOSO_4 \cdot xH_2O$, x is 2 to 5) was added and dissolved in 200 ml of a sulfuric acid aqueous solution containing 7 ml of 95% sulfuric acid, and distilled water was added to finally make 250 ml of a solution. The solution was put in a round-bottom three-necked flask, and heated in an oil bath at 85° C. under stirring by a stirring propeller. In the solution, white turbidity was caused by the self-hydrolysis of titanyl sulfate. The three-necked flask was taken out from the oil bath at 1.5 hours after the start of the heating, and cooled by flowing water. An obtained white-turbid solid material was separated by a centrifugal separator, three times repeatedly washed with distilled water, and dried at 60° C. for one day and night to thereby make a titanium raw material for production of $Na_2Ti_3O_7$.

Figure 2:
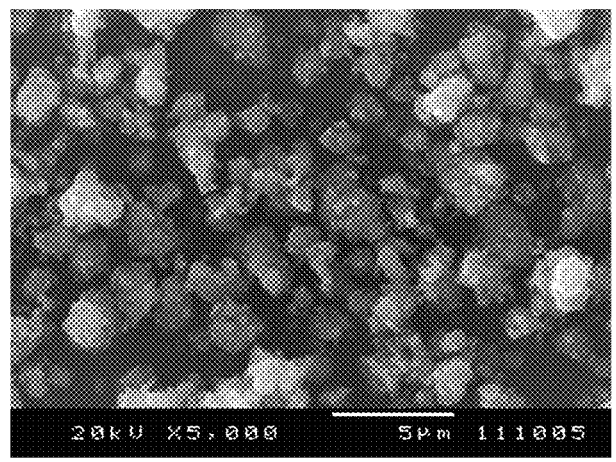
FIG. 2 is a scanning electron microscope photograph of a porous spherical titanium oxide hydrate obtained in Example 1.

It was found that the obtained titanium raw material was an amorphous titanium oxide with broad peaks at the peak position of anatase-type $TiO_2$ in X-ray powder diffractometry. Further, a clear weight loss and endothermic reaction accompanying dehydration were observed at nearly 100° C. by thermogravimetry, revealing that the titanium raw material was a titanium oxide hydrate. It was further found that the titanium raw material was powder, and a porous body which had a specific surface area of 153 m²/g as measured by the BET specific surface area measurement, an average pore diameter of 3.7 nm, and a pore volume of 0.142 cm³/g. It further became clear by the scanning electron microscope (SEM) observation that spherical particles of 1 to 5 μm aggregated (FIG. 2).

Figure 3:
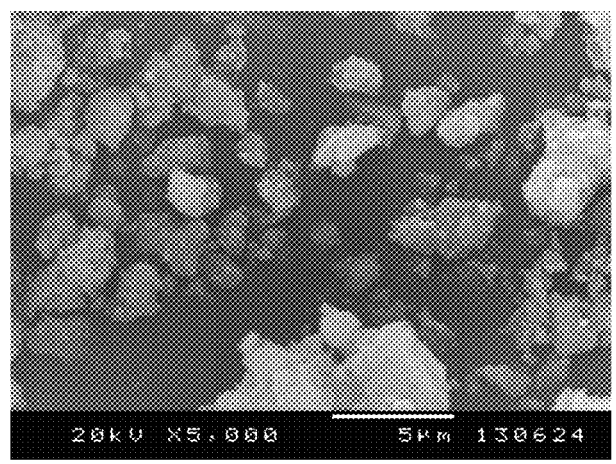
FIG. 3 is a scanning electron microscope photograph of a porous spherical titanium oxide hydrate obtained in Example 1 after impregnation with $Na_2CO_3$.

About 1 g of the porous titanium oxide hydrate was suspended in 100 ml of a $Na_2CO_3$ aqueous solution (pH: 11.3) of 216 g/l, and ultrasonically dispersed for 5 min to thereby fully swell the pore interiors and the surface with the $Na_2CO_3$ aqueous solution, thereafter separated from the aqueous solution by filter filtration, and dried at 60° C. for one day and night. The impregnation amount of the porous titanium oxide hydrate with the $Na_2CO_3$ aqueous solution was previously measured; and the concentration of the $Na_2CO_3$ aqueous solution was made to be one to make a chemical composition of $Na_2Ti_3O_7$. The scanning electron microscope (SEM) observed that the state of the aggregation of spherical particles of 1 to 5 μm was the same as that of the titanium oxide hydrate used as the raw material, and observed no situation of the deposition of crystals of the impregnated $Na_2CO_3$ (FIG. 3). Further, according to an analysis using an energy dispersive X-ray spectrometer, it became clear that since a Na element and a Ti element were both present in individual particles, almost all $Na_2CO_3$ was present in pores inside the particle, or was present in a microparticle state on the particle surface. This was packed in an alumina-made boat, and heated in air at a high temperature by using an electric furnace. The firing temperature was made to be 800° C., and the firing time was made to be 10 hours. Thereafter, the resultant was spontaneously cooled in the electric furnace to thereby obtain Sample 1.

Figure 4:
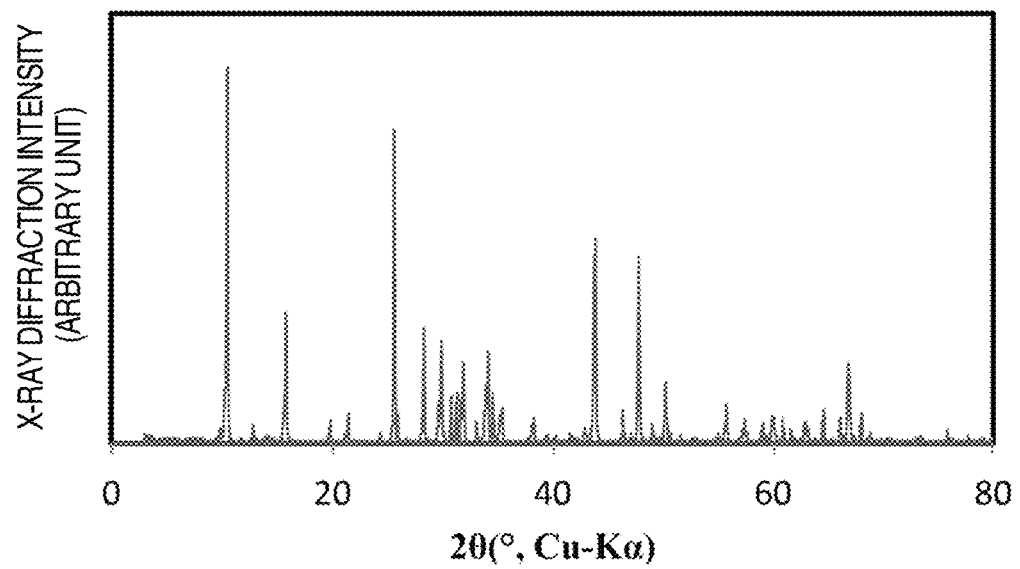
FIG. 4 is an X-ray powder diffraction pattern of $Na_2Ti_3O_7$ (Sample 1) obtained in Example 1.
Figure 5:
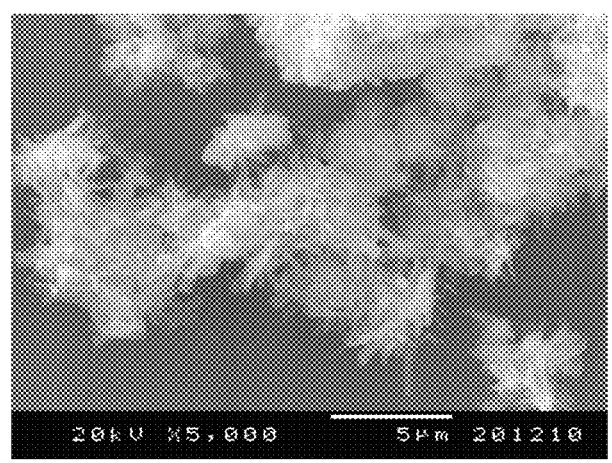
FIG. 5 is a scanning electron microscope photograph of $Na_2Ti_3O_7$ (Sample 1) obtained in Example 1.

It became clear that Sample 1 thus obtained was a single phase of $Na_2Ti_3O_7$ with good crystallinity by X-ray powder diffractometry (FIG. 4). A scanning electron microscope (SEM) observation clarified that needle-like particles of 0.1 to 0.4 μm in diameter and 1 to 5 μm in length aggregated like chestnut spikes to make secondary particles of 2 to 10 μm, which further aggregated to thereby form an aggregate (FIG. 5). It became clear that spherical primary particles of 1 to 5 μm of the porous titanium oxide hydrate formed a large number of $Na_2Ti_3O_7$ particles in needle-like forms by a reaction with $Na_2CO_3$ impregnated in the pore interiors and the surface of the primary particles, and the needle-like particles assembled to thereby form secondary particles. Further, a BET specific surface area measurement clarified that the specific surface area of this powder was 1.8 $m^2$/g, and the particles were solid particles with few pores.

The minimum size of the measurement of the aggregated particles was 1.4 μm; the maximum value thereof was 35.7 μm; and the average particle size was 9.9 μm. Here, the assembly had almost no influence on the specific surface area.

(Production Method of a Proton Exchange Product $H_2Ti_3O_7$)

$Na_2Ti_3O_7$ (Sample 1) obtained in the above was used as a starting raw material, immersed in a 0.5 N hydrochloric acid aqueous solution, and held under the condition of 60° C. for 3 days to thereby carry out a proton exchange treatment. In order to raise the exchange treatment speed, the hydrochloric acid aqueous solution was replaced at every 24 hours. The use amount of the hydrochloric acid aqueous solution per one time was made to be 200 ml with respect to 0.75 g of the $Na_2Ti_3O_7$ sample. Thereafter, the sample was washed with water, and dried at 60° C. for one day and night to thereby obtain a target proton exchange product.

Figure 6:
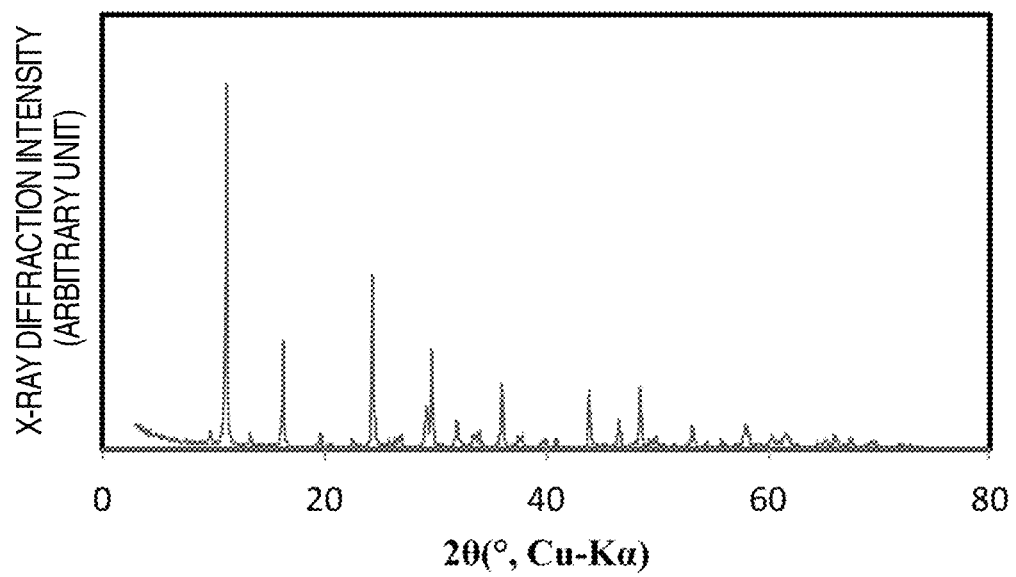
FIG. 6 is an X-ray powder diffraction pattern of $H_2Ti_3O_7$ obtained in Example 1.

It became clear that the proton exchange product thus obtained was a single phase of $H_2Ti_3O_7$ by X-ray powder diffractometry (FIG. 6). Further, a scanning electron microscope (SEM) observation clarified that the proton exchange product was one holding the shape of $Na_2Ti_3O_7$ as the starting raw material, and aggregates of secondary particles formed by assembly of needle-form $H_2Ti_3O_7$ particles.

(Production Method of a Titanium Oxide $H_2Ti_{12}O_{25}$)

Then, the $H_2Ti_3O_7$ obtained in the above was packed in an alumina crucible, thereafter subjected to a heat treatment in air at 280° C. for 5 hours to thereby obtain Sample 2.

Figure 7:
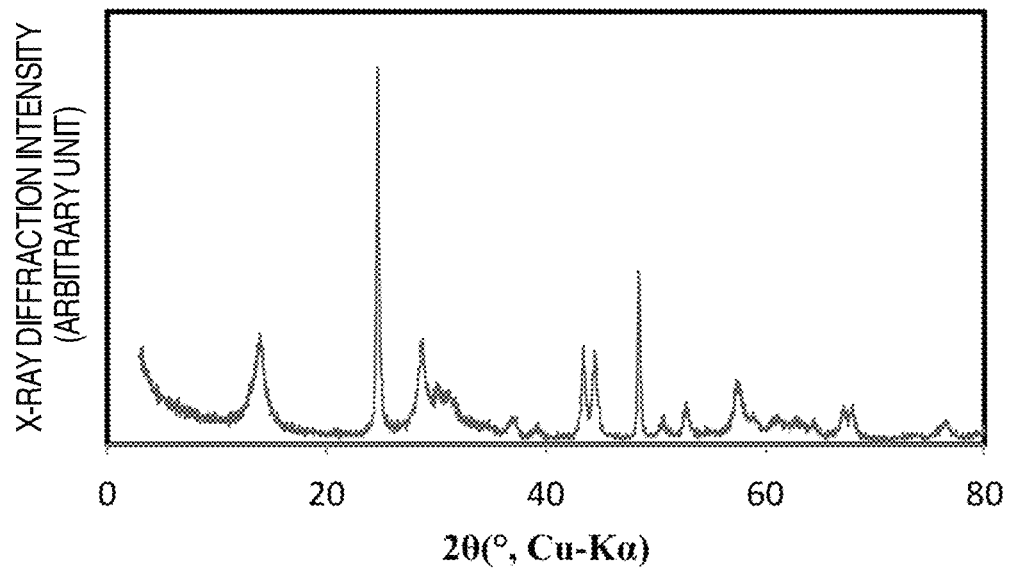
FIG. 7 is an X-ray powder diffraction pattern of $H_2Ti_{12}O_{25}$ (Sample 2) obtained in Example 1.
Figure 8:
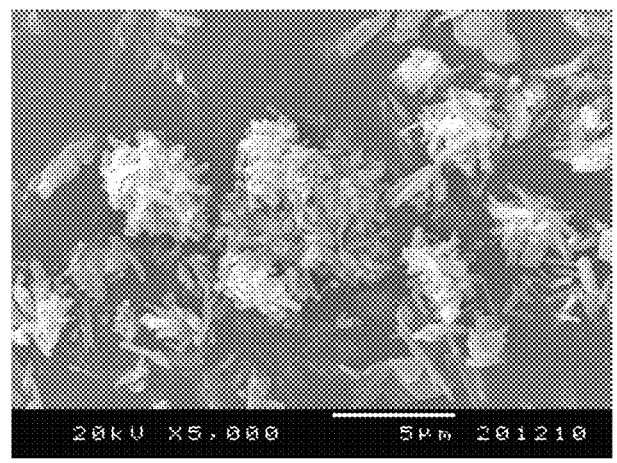
FIG. 8 is a scanning electron microscope photograph of $H_2Ti_{12}O_{25}$ (Sample 2) obtained in Example 1.

It became clear that Sample 2 thus obtained exhibited a diffraction pattern characteristic of $H_2Ti_{12}O_{25}$ as seen in a past report in X-ray powder diffractometry (FIG. 7). Further, a scanning electron microscope (SEM) observation clarified that Sample 2 was an aggregate of secondary particles which held the shape of $Na_2Ti_3O_7$ as the starting raw material and the proton exchange product $H_2Ti_3O_7$, and was made by aggregation of secondary particles made by aggregation of the needle-form $H_2Ti_{12}O_{25}$ particles (FIG. 8).

The weight-average major axis diameter of the needle-like primary particles was 2.30 μm; the weight-average minor-axis diameter thereof was 0.46 μm and the aspect ratio thereof was 5.0 (the number of particles measured: 100). The minimum value of the measurement of the aggregated particles was 1.4 μm; the maximum value thereof was 20.7 μm; and the average particle size was 7.2 μm.

In the above, the aspect ratio was determined from (a weight-average major axis diameter/a weight-average minor-axis diameter). The weight-average major axis diameter and the weight-average minor-axis diameter were values calculated by the following expressions by measuring major-axis diameters and minor-axis diameters of 100 particles, and assuming that all the particles are square pillar-equivalent bodies.

A weight-average major-axis diameter=$\Sigma(Ln \cdot Ln \cdot Dn^2)/\Sigma(Ln \cdot Dn^2)$ A weight-average minor-axis diameter=$/(Dn \cdot Ln \cdot Dn^2)/\Sigma(Ln \cdot Dn^2)$ In the above expressions, n represents the number of the individual particles measured; and Ln represents a major-axis diameter of the n-th particle, and Dn represents a minor-axis diameter of the n-th particle.

(A Lithium Secondary Battery)

Figure 9:
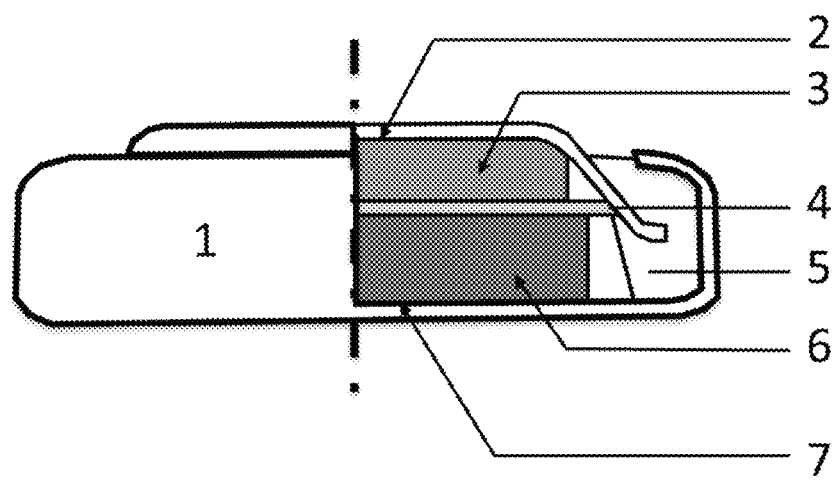
FIG. 9 is a basic structural view of a lithium secondary battery (coin-type cell).

A lithium secondary battery (coin-type cell) as shown in FIG. 9 was fabricated, in which an electrode was fabricated by using $H_2Ti_{12}O_{25}$ (Sample 2) thus obtained as an active material, acetylene black as an electroconductive agent and polytetrafluoroethylene as a binder blended in 5:5:1 in weight ratio; using a lithium metal as a counter electrode; and using as an electrolyte solution a 1 M solution of lithium hexafluorophosphate dissolved in a mixed solvent (1:1 in volume ratio) of ethylene carbonate (EC) and diethyl carbonate (DEC). Then, its electrochemical lithium insertion and extraction behavior was measured. The fabrication of the battery was carried out according to the structure and the assembling method of well-known cells.

Figure 10:
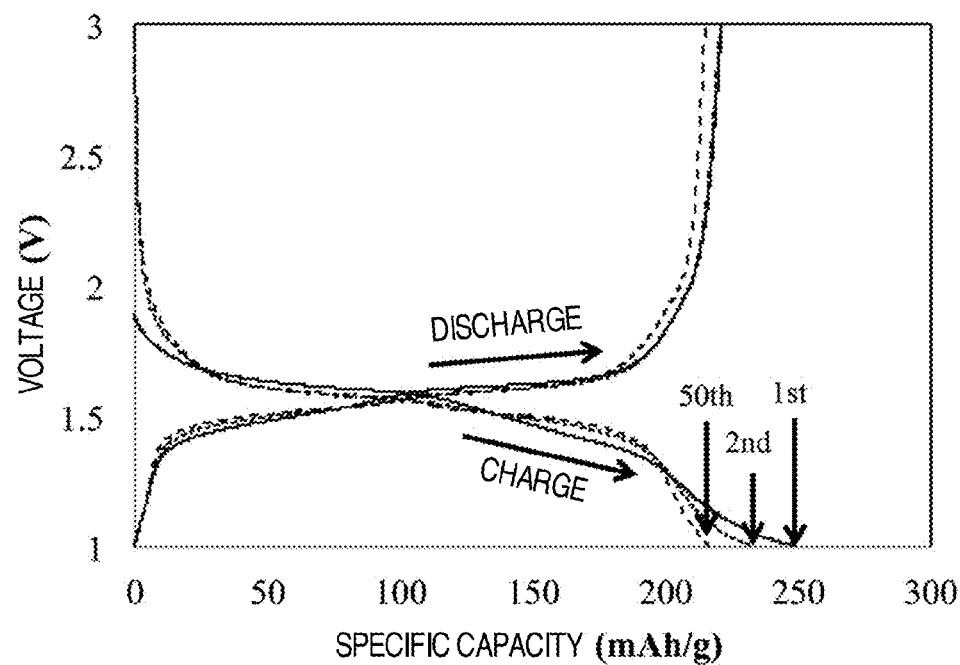
FIG. 10 shows charge and discharge characteristics in the case of using $H_2Ti_{12}O_{25}$ (Sample 2) obtained in Example 1 as a negative electrode material.

For the fabricated lithium secondary battery, there was carried out an electrochemical lithium insertion and extraction test under the temperature condition of 25° C. at a current density of 10 mA/g at cutoff potentials of 3.0 V-1.0 V; then, it was found that a voltage plateau was at nearly 1.6 V, and the reversible lithium insertion and extraction reaction was possible. The voltage variation accompanying the insertion and extraction of lithium is shown in FIG. 10. The lithium insertion amount of Sample 2 was equivalent to 9.04 per chemical formula of $H_2Ti_{12}O_{25}$, and the initial insertion amount per active material weight was 248 mAh/g, which was nearly the same as that of the $TiO_2$(B), and was a larger amount than 236 mAh/g of an isotropic shape $H_2Ti_{12}O_{25}$. The initial charge and discharge efficiency of Sample 2 was 89%, which was higher than 50% of the $TiO_2$(B), and was nearly equal to that of the isotropic shape $H_2Ti_{12}O_{25}$. Further, the capacity retention rate at the initial cycle of Sample 2 was 94%, which was higher than 81% of the $TiO_2$(B), and was nearly equal to that of the isotropic shape $H_2Ti_{12}O_{25}$. It became clear that also after 50 cycles, the discharge capacity of 216 mAh/g could be maintained. From the above, it became clear that the $H_2Ti_{12}O_{25}$ active material with anisotropic structure according to the present invention has a high capacity nearly equal to that of the $TiO_2(B)$ and makes possible a lithium insertion and extraction reaction high in the reversibility nearly equal to that of the isotropic shape $H_2Ti_{12}O_{25}$, and is promising as a lithium secondary battery electrode material.

Comparative Example 1

1 g of a commercially available $TiO_2$ (manufactured by Kojundo Chemical Laboratory Co., Ltd., rutile-type, average particle diameter: 2 μm, specific surface area: 2.8 $m^2/g$) was suspended in 100 ml of a $Na_2CO_3$ aqueous solution (pH: 11.3) of 216 g/l, and ultrasonically dispersed for 5 min; then, the sample was separated from the aqueous solution by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace. The obtained sample contained a rutile-type $TiO_2$ as a main component, and a partially produced $Na_2Ti_6O_{13}$ by an X-ray powder diffractometry. From this, it was found that the obtained sample contained no $Na_2Ti_3O_7$.

Comparative Example 2

Figure 11:
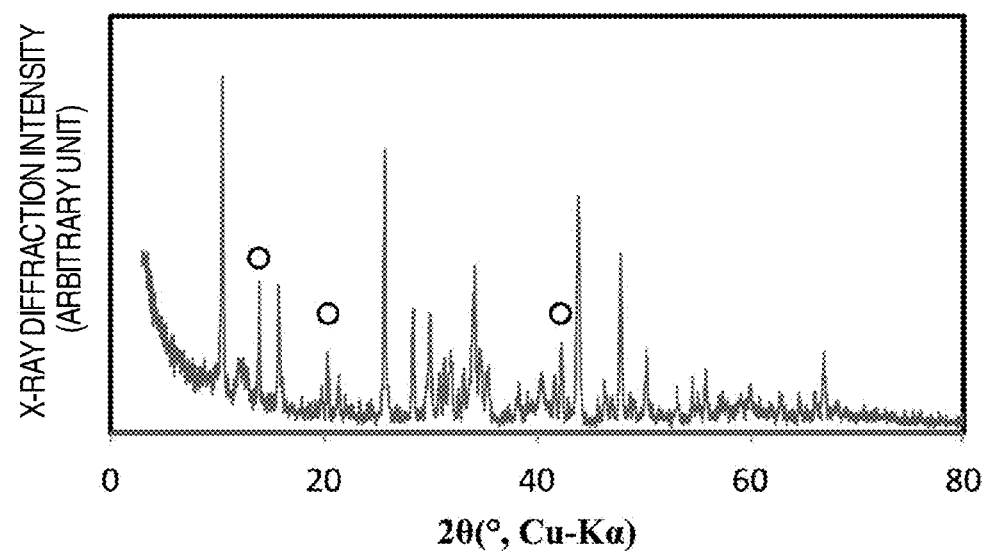
FIG. 11 is an X-ray powder diffraction pattern of a sample obtained in Comparative Example 2.

The titanium oxide hydrate synthesized in Example 1 was collected without drying; and all the amount (60° C., weight after drying: about 0.5 g) synthesized by the one-time synthesis was suspended and stirred in 50 ml of a $Na_2CO_3$ aqueous solution of 216 g/l at room temperature. Then, after the lapse of a half day, the sample was filtered and dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace. The obtained sample exhibited diffraction peaks (◯ marks) of $Na_4Ti_5O_{12}$, other than those of $Na_2Ti_3O_7$ as its main phase, observed by an X-ray powder diffractometry; the intention ratio of maximum peaks (that of $Na_4Ti_5O_{12}$ which was at 14.0° to that of $Na_2Ti_3O_7$ which was at 10.5°) was about 0.4, which meant that the $Na_4Ti_5O_{12}$ was contained in a considerably large amount (FIG. 11). Besides, a large number of unidentified peaks emerged, so it was found that the impregnation of the titanium oxide hydrate with $Na_2CO_3$ was insufficient.

Example 2

6.25 g of titanyl sulfate hydrate ($TiOSO_4 \cdot xH_2O$, x is 2 to 5) was added and dissolved in 200 ml of a sulfuric acid aqueous solution containing 7 ml of 95% sulfuric acid, and distilled water was added to finally make 250 ml of a solution. The solution was put in a beaker; a $Na_2CO_3$ aqueous solution of 240 g/l was dropwise charged at a temperature of 20 to 25° C. under stirring by a magnetic stirrer to thereby obtain a gelatinous precipitation. The dropping speed of the $Na_2CO_3$ aqueous solution was 10 to 25 ml/h, and the dropping was terminated when the pH became 6.

The resultant was separated by a centrifuge, three times repeatedly washed with distilled water, suspended in 250 ml of distilled water, and put in a round-bottom flask and frozen at the liquid nitrogen temperature. The resultant was dried for one day and night by a freeze-drying method involving vacuumizing by a rotary pump to thereby make a titanium raw material for production of $Na_2Ti_3O_7$.

Figure 12:
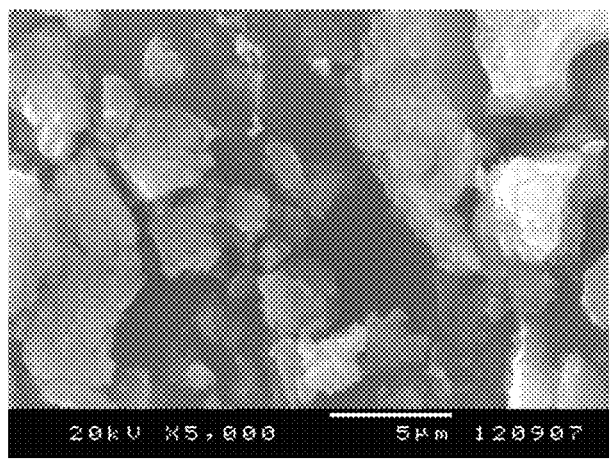
FIG. 12 is a scanning electron microscope photograph of a titanium oxide hydrate obtained in Example 2.

It was found that the obtained titanium raw material was an amorphous titanium oxide with broad peaks at the peak position of anatase-type $TiO_2$ by an X-ray powder diffractometry. A clear weight loss and endothermic reaction accompanying dehydration were observed at nearly 100° C. by thermogravimetry, revealing that the titanium raw material was a titanium oxide hydrate. It was further found that the titanium raw material powder was a porous body which had a specific surface area of 439 $m^2/g$ as measured by the BET specific surface area measurement, an average pore diameter of 3.3 nm, and a pore volume of 0.360 $cm^3/g$. It further became clear by the scanning electron microscope (SEM) observation that particles of 1 to 5 μm which were slightly angular and relatively isotropic aggregated (FIG. 12).

About 1 g of the titanium raw material was suspended in 100 ml of a $Na_2CO_3$ aqueous solution (pH: 11.3) of 216 g/l, and ultrasonically dispersed for 5 min; and thereafter, the sample was separated from the aqueous solution by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the resultant was spontaneously cooled in the electric furnace to thereby obtain Sample 3.

Figure 13:
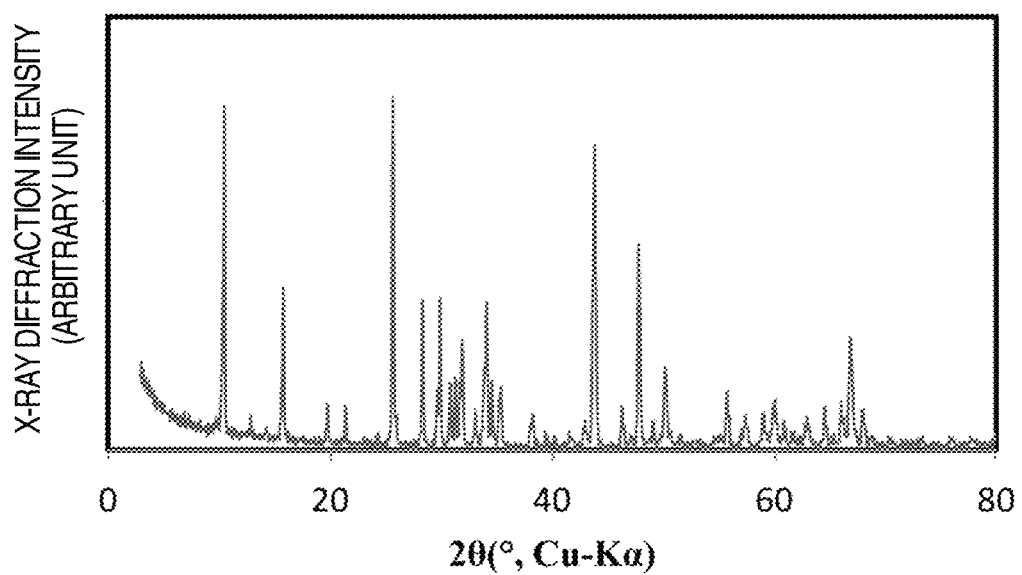
FIG. 13 is an X-ray powder diffraction pattern of $Na_2Ti_3O_7$ (Sample 3) obtained in Example 2.
Figure 14:
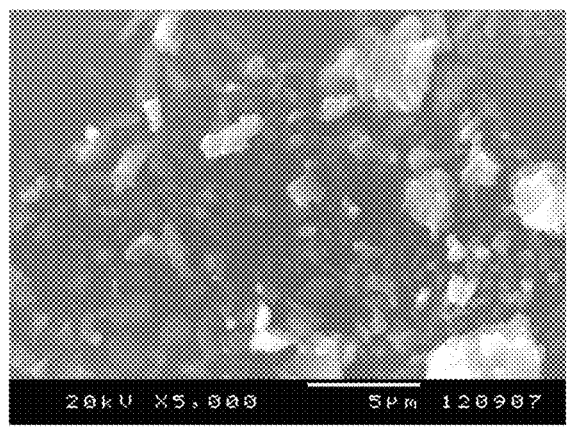
FIG. 14 is a scanning electron microscope photograph of $Na_2Ti_3O_7$ (Sample 3) obtained in Example 2.

It became clear that Sample 3 thus obtained was a single phase of $Na_2Ti_3O_7$ with good crystallinity by an X-ray powder diffractometry (FIG. 13). Further, a scanning electron microscope (SEM) observation clarified that relatively isotropic particles of 1 to 5 μm in diameter were present and these particles aggregated (FIG. 14).

The $Na_2Ti_3O_7$ obtained in the above was used as a starting raw material, immersed in a 0.5N hydrochloric acid aqueous solution, and held under the condition of 60° C. for 3 days to thereby carry out a proton exchange treatment. In order to raise the exchange treatment speed, the hydrochloric acid aqueous solution was replaced at every 24 hours. The use amount of the hydrochloric acid aqueous solution per one time was made to be 200 ml with respect to 0.75 g of the $Na_2Ti_3O_7$ sample. Thereafter, the sample was washed with water, and dried at 60° C. in air for one day and night to thereby obtain a target proton exchange product.

It became clear that the proton exchange product thus obtained was a single phase of $H_2Ti_3O_7$ by an X-ray powder diffractometry. Further, a scanning electron microscope (SEM) observation clarified that the proton exchange product was relatively isotropic particles holding the shape of $Na_2Ti_3O_7$ as the starting raw material, or was their aggregate.

Figure 15:
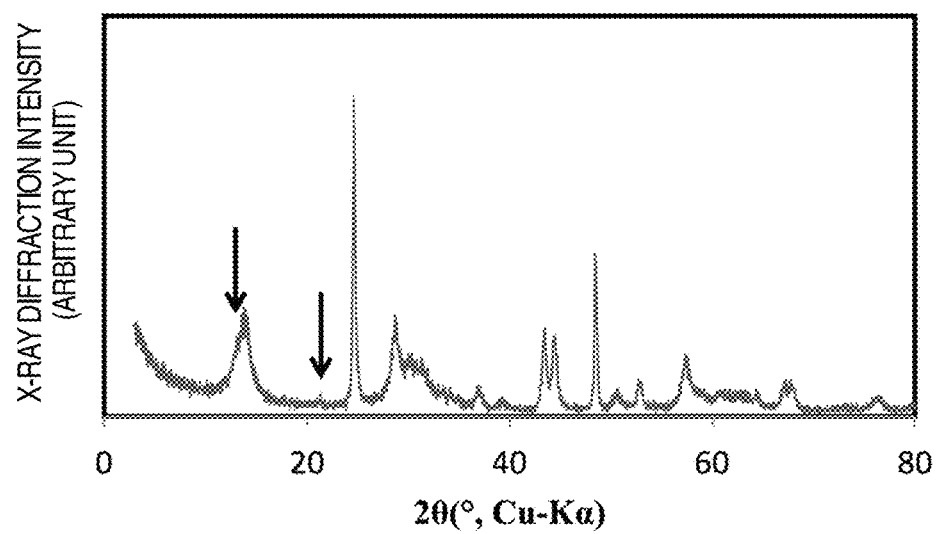
FIG. 15 is an X-ray powder diffraction pattern of $H_2Ti_{12}O_{25}$ (Sample 4) obtained in Example 2.

Then, the $H_2Ti_3O_7$ obtained in the above was packed in an alumina crucible, and thereafter subjected to a heat treatment in air at 280° C. for 5 hours to thereby obtain Sample 4. It became clear that Sample 4 thus obtained almost exhibited a diffraction pattern characteristic of $H_2Ti_{12}O_{25}$ as seen in a past report in X-ray powder diffractometry, but diffraction peaks from traces of $H_2Ti_6O_{13}$ were observed at portions indicated by the arrows (FIG. 15). Further, a scanning electron microscope (SEM) observation clarified that Sample 4 was relatively isotropic particles which held the shape of $Na_2Ti_3O_7$ as the starting raw material and the proton exchange product $H_2Ti_3O_7$, or was their aggregate.

(A Lithium Secondary Battery)

An electrode was fabricated by using the $H_2Ti_{12}O_{25}$ (Sample 4) thus obtained as an active material, acetylene black as an electroconductive agent and polytetrafluoroethylene as a binder blended in 5:5:1 in weight ratio. A lithium secondary battery (coin-type cell) as shown in FIG. 9 was fabricated by using the electrode, using a lithium metal as a counter electrode, and using as an electrolyte solution a 1M solution of lithium hexafluorophosphate dissolved in a mixed solvent (1:1 in volume ratio) of ethylene carbonate (EC) and diethyl carbonate (DEC). Then, its electrochemical lithium insertion and extraction behavior was measured. The fabrication of the battery was carried out according to the structure and the assembling method of well-known cells.

Figure 16:
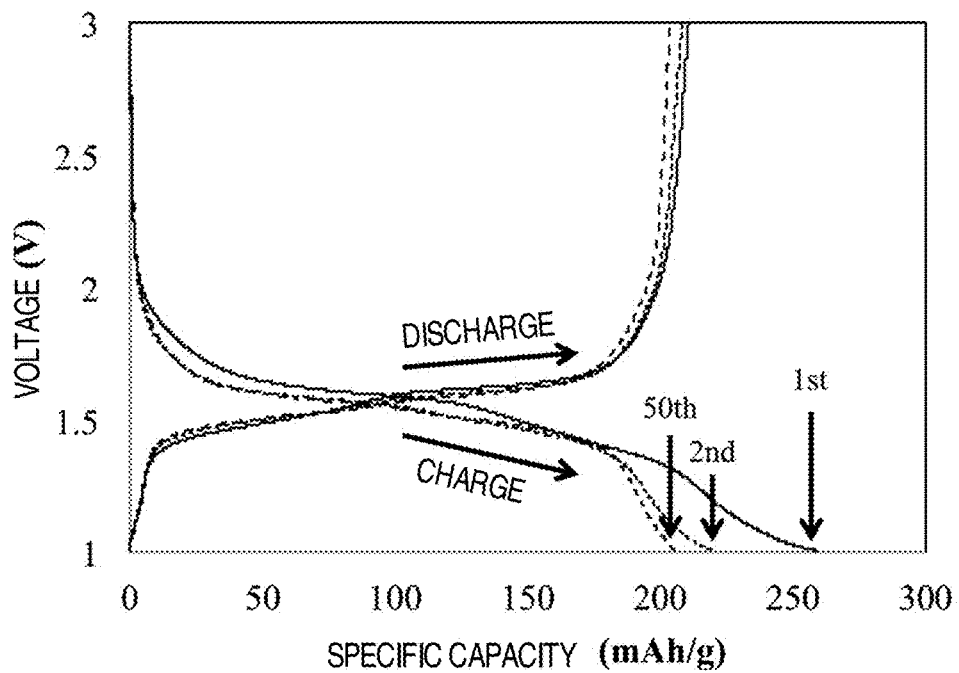
FIG. 16 shows charge and discharge characteristics in the case of using $H_2Ti_{12}O_{25}$ (Sample 4) obtained in Example 2 as a negative electrode material.

For the fabricated lithium secondary battery, there was carried out an electrochemical lithium insertion and extraction test under the temperature condition of 25° C. at a current density of 10 mA/g at cutoff potentials of 3.0 V-1.0 V; then, there was observed the voltage variation having a voltage plateau at nearly 1.6 V and accompanying the reversible lithium insertion and extraction reaction. This voltage variation is shown in FIG. 16. The lithium insertion amount of Sample 4 was equivalent to 9.44 per chemical formula of $H_2Ti_{12}O_{25}$; the initial insertion amount per active material weight was 259 mAh/g, which was nearly equal to that of the $TiO_2(B)$, and was a value higher than 236 mAh/g of the isotropic shape $H_2Ti_{12}O_{25}$. However, the initial charge and discharge efficiency of Sample 4 was 81%, which was higher than 50% of the $TiO_2(B)$, but was lower than that of the isotropic shape $H_2Ti_{12}O_{25}$. The capacity retention rate at the initial cycle of Sample 4 was 85%, which was higher than 81% of the $TiO_2(B)$, but was lower than that of the isotropic shape $H_2Ti_{12}O_{25}$. This is because of the irreversible insertion of lithium due to $H_2Ti_6O_{13}$ contained partially as traces.

Example 3

6.25 g of a titanyl sulfate hydrate ($TiOSO_4 \cdot xH_2O$, x is 2 to 5) was added and dissolved in 200 ml of a sulfuric acid aqueous solution containing 7 ml of 95% sulfuric acid; and 30 g of urea was dissolved, and thereafter, distilled water was added to make 250 ml of an aqueous solution. The aqueous solution was put in a round-bottom three-necked flask, and heated at 95° C. in an oil bath under stirring by a stirring propeller. Ammonia was generated by the hydrolysis of the urea, and white turbidity was generated with the ammonia being as a precipitant. The three-necked flask was taken out from the oil bath at 1 hour and 30 min after the start of heating, and cooled by flowing water. An obtained white-turbid solid material was separated by a centrifugal separator, three times repeatedly washed with distilled water, and dried at room temperature under vacuum for one day and night to thereby make a titanium raw material.

Figure 17:
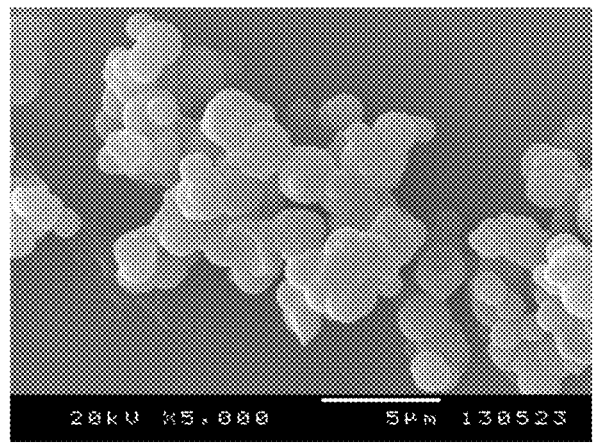
FIG. 17 is a scanning electron microscope photograph of a porous spherical titanium oxide hydrate obtained in Example 3.

For the obtained titanium raw material, an X-ray powder diffractometry was carried out and it was found that the titanium raw material was an amorphous titanium oxide with broad peaks at the peak position of anatase-type $TiO_2$. According to a thermogravimetry, a clear weight loss and endothermic reaction accompanying the dehydration were observed at nearly 100° C., clarifying that the obtained titanium raw material was a titanium oxide hydrate. Further, this powder had a specific surface area of 60 m²/g by a BET specific surface area measurement, and was a porous body with an average pore diameter of 3.1 nm and a pore volume of 0.05 cm³/g. Further, a scanning electron microscope (SEM) observation clarified that spherical particles of 1 to 3 µm aggregated (FIG. 17).

0.2 g of the titanium raw material was suspended in 20 ml of a $LiOH \cdot H_2O$ aqueous solution (pH: 11.0) of 200 g/l, and ultrasonically dispersed for 5 min; thereafter, the sample and the aqueous solution were separated by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace to thereby obtain Sample 5.

Figure 18:
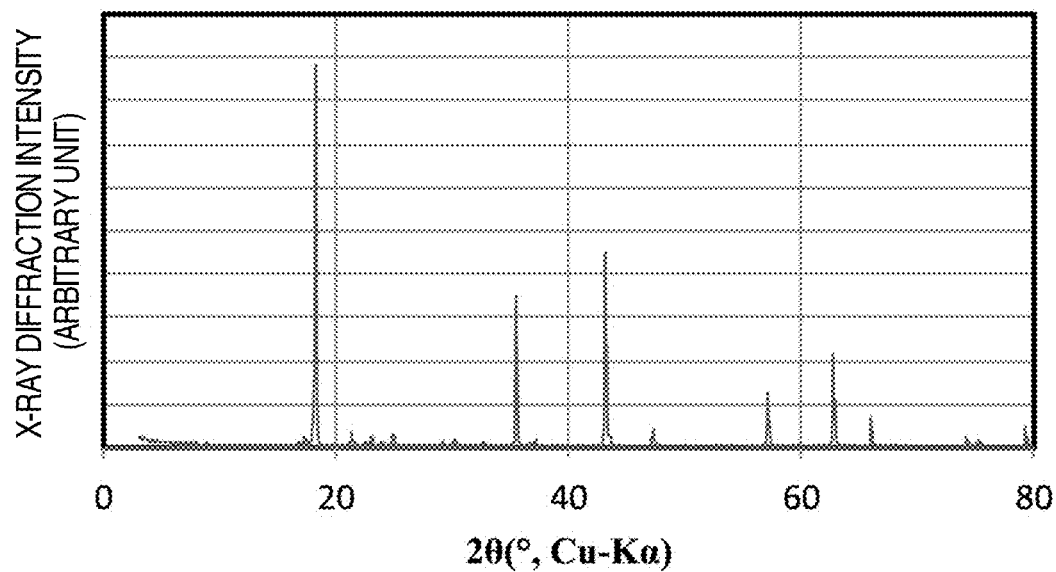
FIG. 18 is an X-ray powder diffraction pattern of $Li_4Ti_5O_{12}$ (Sample 5) obtained in Example 3.
Figure 19:
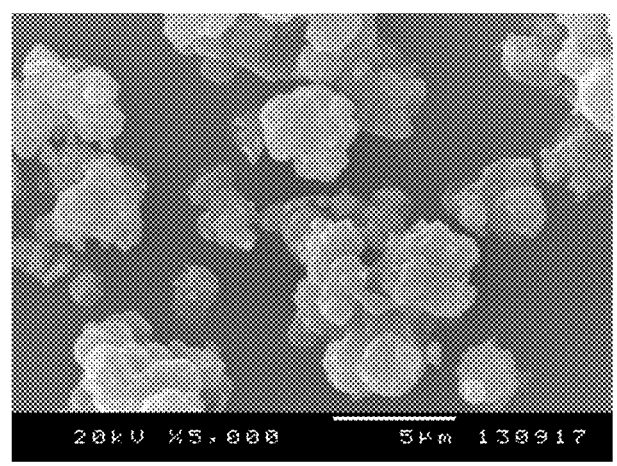
FIG. 19 is a scanning electron microscope photograph of $Li_4Ti_5O_{12}$ (Sample 5) obtained in Example 3.

It became clear that the Sample 5 thus obtained was a single phase of $Li_4Ti_5O_{12}$ with good crystallinity by an X-ray powder diffractometry (FIG. 18). A scanning electron microscope (SEM) observation clarified the presence of slightly angular isotropic particles of about 1 to 3 µm in diameter and the assembly thereof (FIG. 19). Further, a BET specific surface area measurement revealed that the powder had a specific surface area of 0.4 m²/g, and was a solid particle with few pores.

Example 4

About 0.2 g of the titanium oxide hydrate synthesized in Example 3 was suspended in 20 ml of a $K_2CO_3$ aqueous solution (pH: 12.1) of 400 g/l, and ultrasonically dispersed for 5 min; then, the sample and the aqueous solution were separated by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace to thereby obtain Sample 6.

Figure 20:
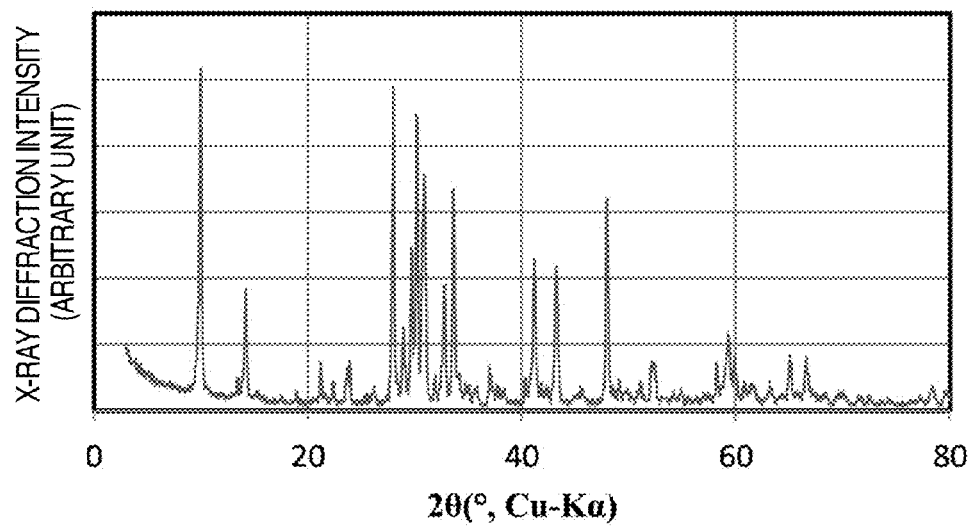
FIG. 20 is an X-ray powder diffraction pattern of $K_2Ti_4O_9$ (Sample 6) obtained in Example 4.
Figure 21:
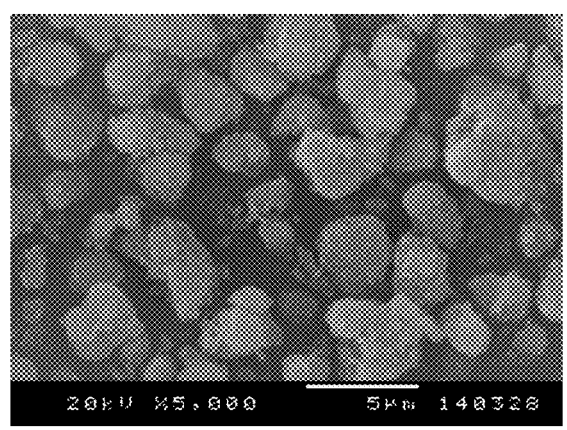
FIG. 21 is a scanning electron microscope photograph of $K_2Ti_4O_9$ (Sample 6) obtained in Example 4.

It became clear that the Sample 6 thus obtained was a single phase of $K_2Ti_4O_9$ with good crystallinity by an X-ray powder diffractometry (FIG. 20). A scanning electron microscope (SEM) observation clarified the presence of slightly angular isotropic particles of about 1 to 3 µm in diameter and the assembly thereof (FIG. 21). Further, a BET specific surface area measurement revealed that the powder had a specific surface area of 1.8 m²/g, and was a solid particle with few pores.

Example 5

0.2 g of the titanium oxide hydrate synthesized in Example 3 was suspended in a solution prepared by adding 0.4 ml of 25% $NH_3$ to 20 ml of a $NaNO_3$ aqueous solution of 400 g/l to thereby regulate the pH at 10.8, and ultrasonically dispersed for 5 min; then, the sample and the aqueous solution were separated by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace to thereby obtain Sample 7.

Figure 22:
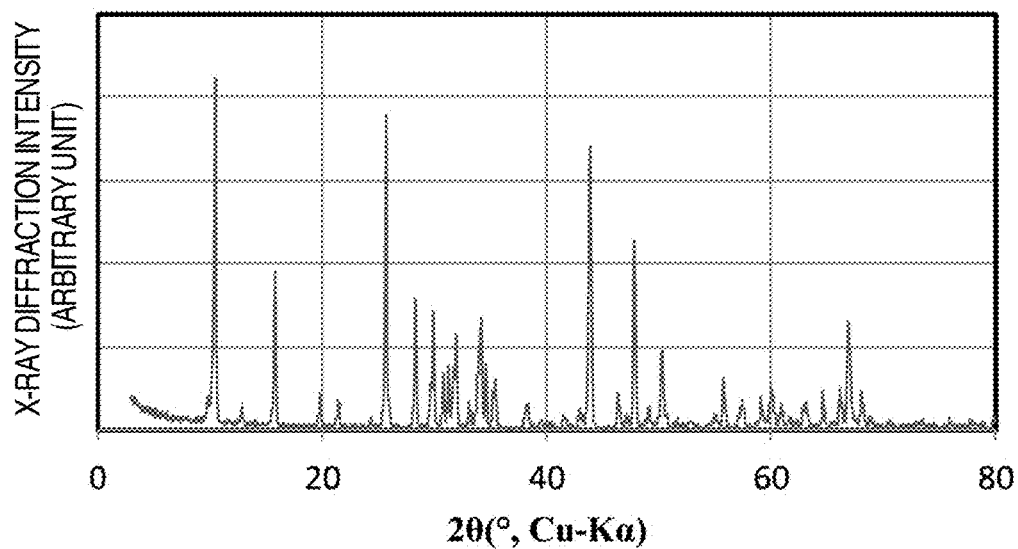
FIG. 22 is an X-ray powder diffraction pattern of $Na_2Ti_3O_7$ (Sample 7) obtained in Example 5.
Figure 23:
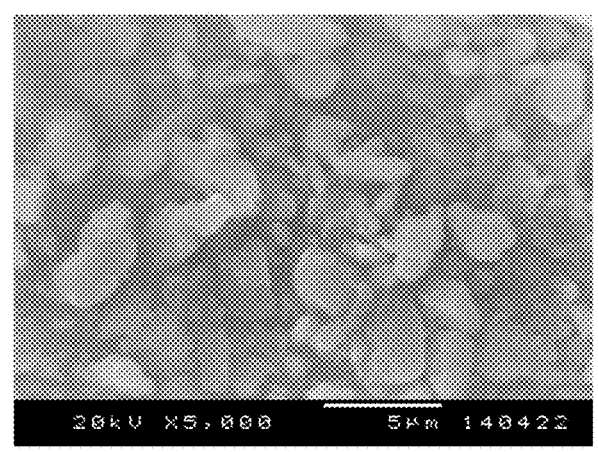
FIG. 23 is a scanning electron microscope photograph of $Na_2Ti_3O_7$ (Sample 7) obtained in Example 5.

It became clear that the Sample 7 thus obtained was a single phase of $Na_2Ti_3O_7$ with good crystallinity by an X-ray powder diffractometry (FIG. 22). Further, a scanning electron microscope (SEM) observation clarified the presence of slightly angular isotropic particles of about 1 to 3 μm in diameter and the assembly thereof (FIG. 23).

Comparative Example 3

Figure 24:
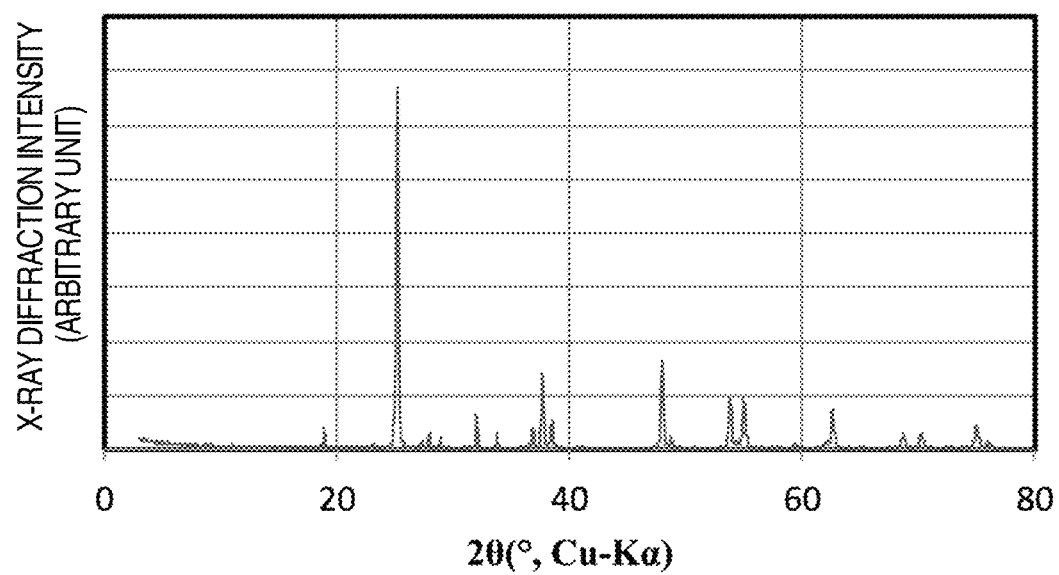
FIG. 24 is an X-ray powder diffraction pattern of a sample obtained in Comparative Example 3.

0.2 g of the titanium oxide hydrate synthesized in Example 3 was suspended in 20 ml of a $NaNO_3$ aqueous solution (pH: 6.2) of 400 g/l without any pH adjustment, and ultrasonically dispersed for 5 min; then, the sample and the aqueous solution were separated by filter filtration. Thereafter, the sample was dried at 60° C. for one day and night. The sample was packed in an alumina-made boat, and heated in air at a high temperature by using an electric furnace. The firing temperature was made to be 800° C., and the firing time was made to be 10 hours. Thereafter, the sample was spontaneously cooled in the electric furnace. The obtained sample had anatase-type $TiO_2$ as its main phase observed by an X-ray powder diffractometry and unclear low peaks not coinciding with those of $Na_2Ti_3O_7$ confirmed thereby (FIG. 24). Further, a scanning electron microscope (SEM) observation clarified the presence of spherical particles of 1 to 3 μm in diameter and the assembly thereof, and holding the shape of the titanium oxide hydrate as the raw material as it was.

INDUSTRIAL APPLICABILITY

According to the methods of the present invention, there can be produced an alkali metal titanium oxide with homogeneous composition in which no by-products with different compositions and no unreacted raw materials remain, and a proton exchange product and a titanium compound obtained by treating the alkali metal titanium oxide. The methods do not need special apparatuses, and since raw materials to be used are inexpensive, can produce materials of a low cost and a high added value.

In the alkali metal titanium oxide obtained by the method according to the present invention and the titanium oxide obtained by the heat treatment of the proton exchange product of the alkali metal titanium oxide, individual particles thereof have a high homogeneity and the particles thereof take a reasonable-size aggregate structure and are easy in handling.

Particularly, $H_2Ti_{12}O_{25}$ obtained by the method according to the present invention is remarkably high in the practical value as a lithium secondary battery electrode material which has a high capacity, and is excellent in the viewpoints of the initial charge and discharge efficiency and the cycle characteristics.

Further a lithium secondary battery in which the titanium oxide $H_2Ti_{12}O_{25}$ is applied as its active material to the electrode material is a battery which is expected to have a high capacity, allows the reversible lithium insertion and extraction reactions, and can cope with the charge and discharge cycle over a long period.

REFERENCE SIGNS LIST

1: COIN-TYPE LITHIUM SECONDARY BATTERY
2: NEGATIVE ELECTRODE TERMINAL
3: NEGATIVE ELECTRODE
4: SEPARATOR+ELECTROLYTE SOLUTION
5: INSULATING PACKING
6: POSITIVE ELECTRODE
7: POSITIVE ELECTRODE CAN

The invention claimed is:

1. A method for producing an alkali metal titanium oxide, comprising impregnating a pore interior and a surface of a porous titanium compound particle with an alkali metal-containing component, and firing the particle, wherein the porous titanium compound particle has a specific surface area of 50 $m^2/g$ or larger and smaller than 1,000 $m^2/g$, and the porous titanium compound particle has a particle size of 0.1 μm or larger and smaller than 100 μm.

2. The method according to claim 1, wherein the porous titanium compound particle has a particle size of 0.5 μm or larger and smaller than 50 μm.

3. The method according to claim 1, wherein the porous titanium compound particle has a specific surface area of 50 $m^2/g$ or larger and smaller than 600 $m^2/g$.

4. The method according to claim 1, wherein the alkali metal titanium oxide has a specific surface area of 0.1 $m^2/g$ or larger and smaller than 10 $m^2/g$.

5. The method according to claim 1, wherein the impregnation with the alkali metal-containing component is suspending the porous titanium compound particle in an aqueous solution of an alkali metal compound with a pH of 8 or higher.

6. The method according to claim 1, wherein ultrasonic wave irradiation is conducted during the impregnation with the alkali metal-containing component.

7. The method according to claim 1, wherein the porous titanium compound particle is dried before the impregnation with the alkali metal-containing component.

8. The method according to claim 1, wherein the alkali metal titanium oxide has a shape of a secondary particle made by assembly of primary particles with anisotropic structure.

9. The method according to claim 1, wherein the alkaline metal titanium oxide has a shape of a primary particle with isotropic structure.

* * * * *